US008006239B2

United States Patent
Sankaranarayanan et al.

(10) Patent No.: US 8,006,239 B2
(45) Date of Patent: Aug. 23, 2011

(54) PROGRAM ANALYSIS USING SYMBOLIC RANGES

(75) Inventors: Sriram Sankaranarayanan, Plainsboro, NJ (US); Aarti Gupta, Princeton, NJ (US); Franjo Ivancic, Jersey City, NJ (US); Ilya Shlyakhter, Franklin Park, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 890 days.

(21) Appl. No.: 12/015,126

(22) Filed: Jan. 16, 2008

(65) Prior Publication Data

US 2008/0172653 A1 Jul. 17, 2008

Related U.S. Application Data

(60) Provisional application No. 60/885,028, filed on Jan. 16, 2007.

(51) Int. Cl.
*G06F 9/44* (2006.01)
*G06F 9/45* (2006.01)
(52) U.S. Cl. ......... 717/154; 717/124; 717/131; 717/151
(58) Field of Classification Search .......... 717/124–135, 717/151–161
See application file for complete search history.

(56) References Cited

U.S. PATENT DOCUMENTS

| 4,642,765 | A | * | 2/1987 | Cocke et al. | 717/153 |
| 6,014,723 | A | * | 1/2000 | Tremblay et al. | 711/1 |
| 6,343,375 | B1 | * | 1/2002 | Gupta et al. | 717/152 |
| 6,519,765 | B1 | * | 2/2003 | Kawahito et al. | 717/127 |
| 6,665,864 | B1 | * | 12/2003 | Kawahito et al. | 717/151 |
| 7,222,337 | B2 | * | 5/2007 | Click et al. | 717/160 |
| 7,260,817 | B2 | * | 8/2007 | Kawahito et al. | 717/155 |

OTHER PUBLICATIONS

Cousot et al., "Static Determination of Dynamic Properties of Programs," Apr. 1976, pp. 106-130.*
Blume et al., "Demand-Driven, Symbolic Range Propagation," 1995, p. 141-160.*
Blume et al., "Symbolic Range Propagation," 1995, IEEE, p. 357-363.*
Markovskiy, Yury, "Range Analysis with Abstract Interpretation," Dec. 2002, p. 1-8.*
Xie et al., "Archer: Using Symbolic, Pathsensitive Analysis to Detect Memory Access Errors," 2003, ACM.*
Su et al., "A Class of Polynomially Solvable Range Constraints for Interval Analysis withoutWidenings and Narrowings," 2004.*
Rugina et al., "Symbolic Bounds Analysis of Pointers, Array Indices, and Accessed Memory Regions," Mar. 2005, ACM, p. 185-235.*
Zaks et al., "Range Analysis for Software Verification," 2006, p. 1-17.*

* cited by examiner

*Primary Examiner* — Wei Zhen
*Assistant Examiner* — Qing Chen
(74) *Attorney, Agent, or Firm* — Jeffery J. Brosemer; Joseph Kolodka

(57) ABSTRACT

A computer implemented method for generating a representation of relationships between variables in a program employing Symbolic Range Constraints (SRCs) wherein the SRCs are of the form $\phi: \bigwedge_{i=1}^{n} l_i \leq x_i \leq u_i$ where for each $i \in [1,n]$, the linear expressions $l_i, u_i$ are made up of variables in the set $\{x_{i+1}, \ldots, x_n\}$ and wherein the SRCs comprise linear, convex, and triangulated constraints for a given variable order.

13 Claims, 6 Drawing Sheets

```
void foo(int i,int j)
{
    int x=i,y=j;

if (x<=0)
        return;

while(x>0)
    {
        x--;
        y--;
    } if (y==0)
        assert(i==j);
}
```

*FIG. 1A*

(1) $x \in [i_0, i_0], y \in [j_0, j_0]$ (2) $x \in [0, i_0], y \in [-\infty, j_0]$ (3) $x \in [0, i_0-1], y \in [-\infty, j_0-1]$ (4) $x \in [0,0], y \in [-\infty, j_0]$ (5) $x \in [0,0], y \in [0,0]$ (6) $x \in [0,0], y \in [0,0]$

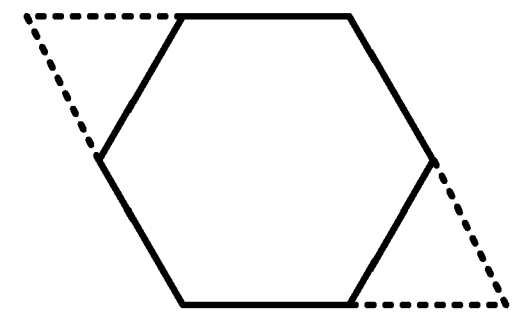
FIG 2E
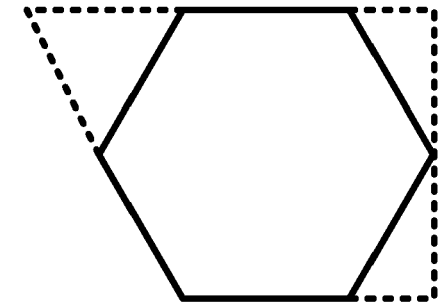
FIG 2D
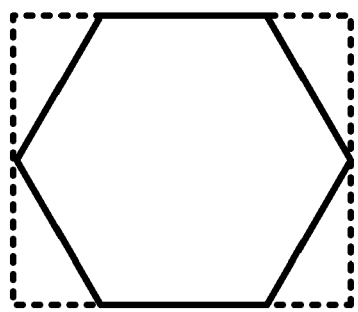
FIG 2C
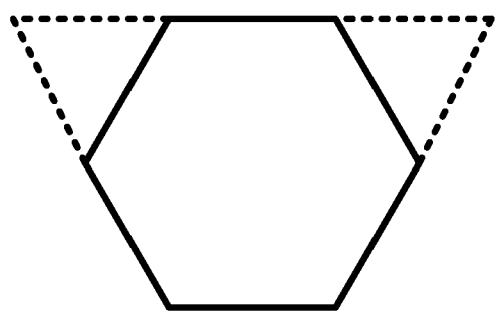
FIG 2B
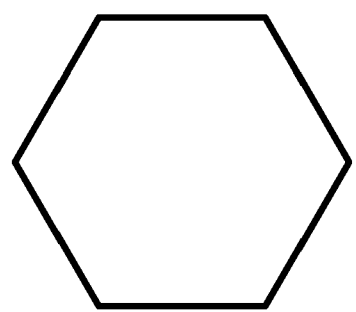
FIG 2A
FIG. 2

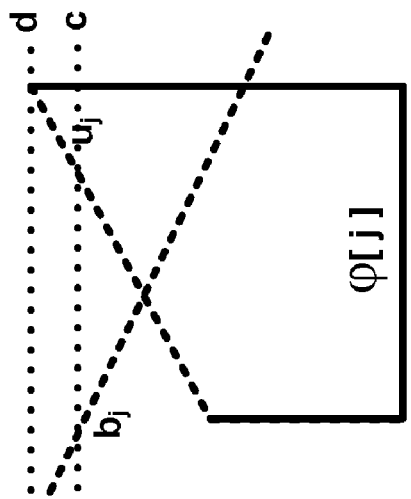
FIG 3C
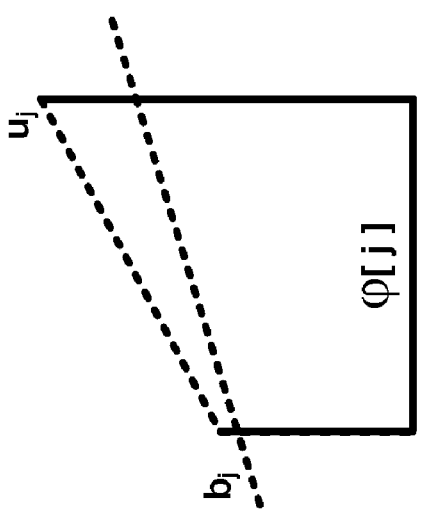
FIG 3B
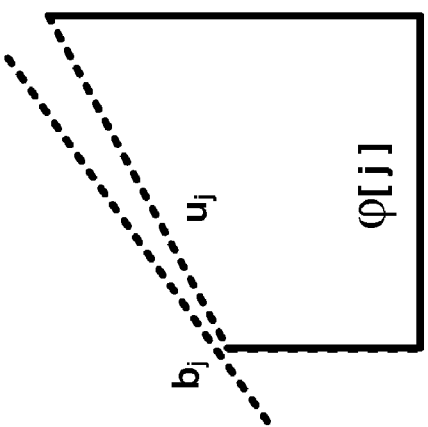
FIG 3A
FIG. 3

PROGRAM ANALYSIS USING SYMBOLIC RANGES

CROSS REFERENCE TO RELATED APPLICATIONS

This application claims the benefit of U.S. Provisional Application No. 60/885,028 filed Jan. 16, 2007.

FIELD OF THE INVENTION

This invention relates generally to the of program analysis and in particular to program analysis techniques that derives symbolic bounds on variable values used in computer programs.

BACKGROUND OF THE INVENTION

Interval analysis is but one technique used to determine static lower and upper bounds on values of computer program variables. While these determined interval bounds are useful—especially for inferring invariants to prove buffer overflow checks—they nevertheless are inadequate as invariants due to a lack of relational information among the variables.

Abstract Interpretation (see Patrick Cousot & Radhia Cousot, ACM Principles of Programming Languages, 1977) is a framework that allows us to analyze programs to infer useful information such as intervals for variables. An abstract interpretation over a program requires us to define some basic components in a mathematically well-defined way to carry out program analysis automatically. By the way of further background, commercial as well as freely available tools such as F-Soft(NEC Laboratories America), Astree(Airbus Inc.), PolySpace(Mathworks Inc.) and CodeSonar(GrammaTech Inc.) implement the generic abstract interpretation algorithm. To instantiate such frameworks, we need to arrive at suitable representation (abstract domain objects) and algorithms to perform the following mathematical operations on the representation: (a) Join, (b)Intersection, (c)Transfer Function, (d) Projection, (e) Widening, (f) Narrowing and (g) Inclusion check.

Any mathematically sound (see e.g., Patrick Cousot & Radhia Cousot, "Abstract Interpretation: A unified lattice model for static analysis of programs by construction or approximation of fixpoints", *ACM Principles of Programming Languages*, pp. 238-252, 1977.) definition of the representation accompanied by algorithms to carry out operations (a-f) described above constitute a mathematically sound abstract domain. Such domains can be used as black-boxes by the frameworks mentioned above to perform useful program analysis tasks oriented towards program verification, optimization and other applications of this framework.

Interval Ranges (see, e.g., Patrick Cousot & Radhia Cousot, "Static Determination of Dynamic Properties of Program", *Proceedings of the Second International Symposium on Programming*, pp. 106-130, 1976), Polyhedra (see, e.g., Patrick Cousot & Nicholas Halbwachs, "Automatic Discovery of linear restraints among the variables of a program", *ACM Principles of Programming Languages*, pp 84-97, 1979) and Octagons (see Antoine Mine, *PhD Thesis, Ecole Normale Superiure*, 2005) are examples of abstract domains that provide representations and algorithms sufficient to carry out abstract interpretation. They are targeted towards buffer overflow detection by computing variable ranges but can be applicable to other applications as well.

SUMMARY OF THE INVENTION

An advance is made in the art according to the principles of the present invention directed to a computer implemented technique for deriving symbolic bounds on computer program variable values using abstract interpretation.

We provide a new representation: Symbolic Range Constraints (SRC) and describe algorithms for operations join, intersection, transfer functions, widening, narrowing, projection and inclusion check to enable the implementation of an abstract interpretation scheme using SRCs.

BRIEF DESCRIPTION OF THE DRAWING

A more complete understanding of the present invention may be realized by reference to the accompanying drawings in which:

FIG. 1(A) is a program excerpt for a motivating example of the present invention;

FIG. 1(C) is an interval analysis for the example of FIG. 1(A);

FIG. 1(D) is a symbolic range analysis for the example of FIG. 1(A);

FIG. 2(A) depicts a 2D hexagon while FIGS. 2(B)-2(E) are a series of four possible abstractions of that 2D hexagon;

FIG. 3(A)-3(C) show three situations encountered during abstraction.

DETAILED DESCRIPTION

Figure 1B:
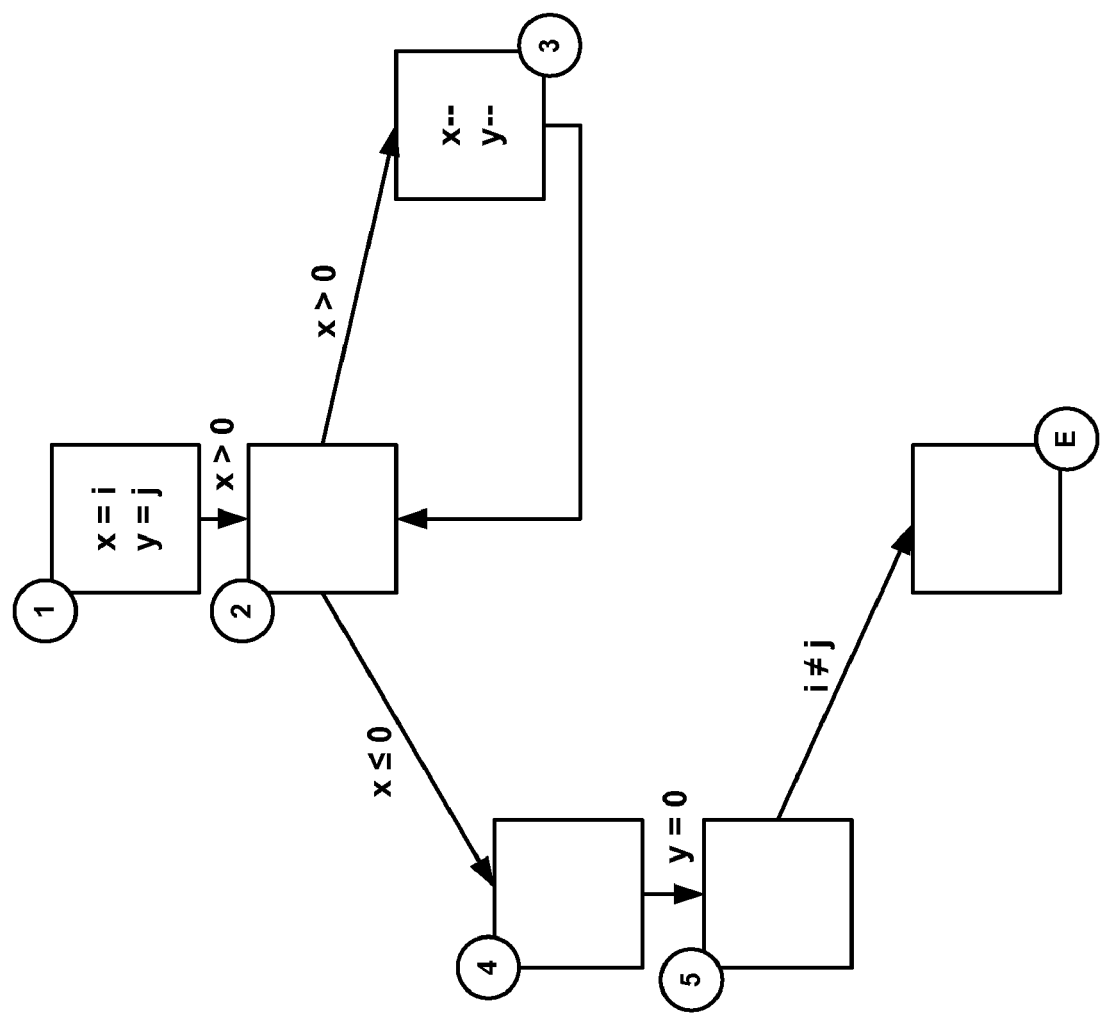
FIG. 1(B) is a sliced control follow graph for the example of FIG. 1(A)

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, the diagrams herein represent conceptual views of illustrative structures embodying the principles of the invention.

For our purposes herein, we illustrate symbolic ranges for invariant computation using a motivating example presented in FIG. 1(A). With reference to that figure, and assuming that the analysis starts at the function foo, we analyze whether the assertion at the end of the function holds. FIG. 1(B) shows a control flow graph for this example after program slicing. FIG. 1(C) shows an interval analysis computation for this example. In this example, interval analysis is not powerful enough to conclude that the assertion can never be violated.

1. A Motivating Example

Consider the analysis using symbolic ranges, for the variable ordering i,j, x, y (see FIG. 1(D)). Since symbolic ranges can represent the loop invariant $y=x-i+j$, the analysis discovers that for $x=y=0$ which implies that $i=j$ at the point of the assertion. Note also that this assertion cannot be proved using octagons, since the loop invariant is not expressible in terms of octagonal relationships.

2. Symbolic Range Constraints

We now provide a description of the symbolic range constraints (SRCs) and the basic algorithms required to implement abstract interpretation schemes using SRCs. The description and examples provided in this section are at a level of detail sufficient for any practitioner skilled in the art of building program analyzers to effectively apply our invention.

Let R represent the reals and $R^+$, the set of extended reals ($R \cup \{\pm\infty\}$). Let $\vec{x}$ denote a vector of $n>0$ real-valued variables. The $i^{th}$ component of the vector $\vec{x}$ is written $x_i$. We use A, B, C to denote matrices. Throughout this section, we fix a variable ordering given by $x_1 \prec x_2 \prec \ldots \prec x_n$, with the index i of a variable $x_i$ being synonymous with its rank in this ordering.

A linear expression is of the form e: $\vec{c}^T\vec{x}+d$ where $\vec{c}$ is a vector of coefficients over the reals, while $d \in R^+$ is the constant coefficient. By convention, a linear expression of the form $c^T\vec{x} \pm \infty$ is identical to $\vec{0}^T\vec{x} \pm \infty$. For instance, the expression $2x_1 + \infty$ is identical to $0x_1 + \infty$. A linear inequality is of the form $e \bowtie 0$, where $\bowtie \in \{\geq, \leq, =\}$. A linear constraint is a conjunction of finitely many linear inequalities $\phi: \wedge_i e_i \geq 0$.

Given an inequality $e \geq 0$, where e is not a constant, its lead variable $x_i$ is the least index i s.t. $c_i \neq 0$. We may write such an inequality in the bounded form $x_i \bowtie e_i$, where $x_i$ is the lead variable and $$e_i = \frac{1}{c_i} e - x_i.$$

The sign $\bowtie$ denotes the reversal of the direction of the inequality if $c_i < 0$.

As an example, consider the inequality $2x_2 + 3x_5 + 1 \leq 0$. Its lead variable is $X_2$ and bounded form is $$x_2 \leq -\frac{3}{2}x_5 - \frac{1}{2}.$$

We reuse the $\models$ relation to denote entailment among linear constraints in the first order theory of linear arithmetic.

Definition 3—Symbolic Range Constraint: A symbolic range constraint (SRC) is of the form $\phi: \wedge_{i=1}^{n} l_i \leq x_i \leq u_i$ where for each $i \in [1,n]$, the linear expressions $l_i, u_i$ are made up of variables in the set $\{x_{i+1}, \ldots, x_n\}$. In particular, $l_n, u_n$ are constants. The linear assertions false and true are also assumed to be srcs.

The absence of a bound for $x_j$ is modeled by setting the bound to $\pm\infty$. Given an SRC $\phi: \wedge_{j}^{n} l_j \leq x_j \leq u_j$, let $\phi_{[i]}$ denote the assertion $\wedge_{j}^{n} l_j \leq x_j \leq u_j$.

EXAMPLE 1

$\phi: x_2+4 \leq x_1 \leq 2x_3+x_2+4 \wedge -x_3 \leq x_2 \leq x_3+4 \wedge -\infty \leq x_3 \leq 0$ is a SRC. The variable ordering is $x_1 \prec x_2 \prec x_3$. The bound for $x_1$ involves $\{x_2, x_3\}$, $x_2$ involves $\{x_3\}$ and $x_3$ has constant bounds.

Implied constraints & normalization. Given a symbolic range $l_i \leq x_i \leq u_i$, its implied inequality is $l_i \leq u_i$. Note that the implied inequality $l_i \leq u_i$ only involves variables $x_{i+1}, \ldots, x_n$.

Definition 4—Normalization: A SRC is normalized iff for each variable bound $l_i \leq x_i \leq u_i$, $\phi_{[i+1]} \models l_i \leq u_i$. By convention, the empty and universal SRC are normalized.

EXAMPLE 2

The SRC $\phi$ from Example 1 is not normalized. The implied constraint $0 \leq 2x_3$ derived from the range $x_2+4 \leq x_1 \leq 2x_3+x_2+4$ is not implied by $\phi_{[2]}$. The equivalent SRC $\phi'$ is normalized:

$\phi': x_2+4 \leq x_1 \leq 2x_3+x_2+4 \wedge -x_3 \leq x_2 \leq x_3+4 \wedge 0 \leq x_3 \leq 0$ Unfortunately, not every SRC has a normal equivalent. The SRC $\psi: x_2-x_3 \leq x_1 \leq 1 \wedge 0 \leq x_2 \leq 2 \wedge 0 \leq x_3 \leq 2$ forms a counterexample. The projection of $\psi$ on the $\{x_2, x_3\}$ is a five sided polygon, whereas any SRC in 2D is a trapezium.

Weak optimization algorithms: Optimization is used repeatedly as a primitive for other domain operations including abstraction, join and intersection. Consider the optimization instance min.(e: $\vec{c}^T\vec{x}+d$) s.t. $\phi$. Let $\phi$ be a satisfiable SRC with bound $l_j \leq x_j \leq u_j$ for index $0 \leq j < n$. We let $$e \xrightarrow{\phi, j} e'$$

denote the replacement of $x_j$ in e by $l_j$ (lower bound in $\phi$) if its coefficient in e is positive, or $u_j$ otherwise.

Formally, $$e' = \begin{cases} e - c_j x_j + c_j l_j, & c_j \geq 0 \\ e - c_j x_j + c_j u_j, & c_j < 0 \end{cases}$$

The canonical sequence, given by $$e \xrightarrow{\phi, 1} e_1 \ldots \xrightarrow{\phi, n} e_n,$$

replaces variables in the ascending order of their indices. The canonical sequence, denoted in short by $$e \xrightarrow{\phi} e_n,$$

is unique and yields a unique result. The following lemma follows from the triaangulation of SRCs.

Lemma 1: For the canonical sequence $$e \xrightarrow{\phi, 1} e_1 \ldots \xrightarrow{\phi, n} e_n,$$

each intermediate expression $e_i$ involves only the variables in $\{x_{i+1}, \ldots, x_n\}$. Specifically, $e_n \in \Re^+$.

EXAMPLE 3

Consider the SRC $\phi'$ defined in Example 2 and the expression: e: $-3x_1+2x_2+8x_3$. This yields the sequence:

$-3x_1 + 2x_2 + 8x_3 \xrightarrow{\phi',1} -x_2 + 2x_3 - 12 \xrightarrow{\phi',2}$ $x_3 - 16 \xrightarrow{\phi',3} -16.$ It follows that $e_n$ under-approximates the minima of the optimization problem, and if $\phi$ is normalized, weak optimization computes the exact minima; the same result as any other LP solver.

Theorem 1—Weak Optimization Theorem: Given a constraint $\phi$ and the sequence $e^\phi e_n$, $\phi \models e \geq e_n$. Furthermore, if $\phi$ is normalized then $e_n = \min$ es.t.$\phi$.

Weak optimization requires O(n) rewriting steps, each in turn involving arithmetic over expressions of size O(n). Therefore, the complexity of weak optimization for a SRC with n constraints is $O(n^2)$.

EXAMPLE 4

From Theorem 1, it may be determined that −16 is the exact minimum in Example 3. Consider the equivalent constraint $\phi$ from Example 1. The same objective minimizes to −∞ (unbounded) if performed w.r.t. $\phi$.

Optimization provides an inference mechanism: given d=min es.t.$\phi$, we infer $\phi \models e \geq d$. By Theorem 1, an inference using weak optimization is always sound. It is also complete, if the constraint $\phi$ is also normalized. Given SRC $\phi$, we write $\phi \models_w e \geq 0$ to denote inference of $e \geq 0$ from $\phi$ by weak optimization. Similarly, $\phi \models_w \hat{}_i e_i \geq 0$ iff $(\forall i) \phi \models_w e_i \geq 0$.

Optimization for SRCs can also be solved by efficient algorithms such as SIMPLEX or interior point techniques. We refer to such techniques as strong optimization techniques. In practice, however, we prefer weak optimization since (a) it out-performs LP solvers, (b) is less dependent on floating point arithmetic, and (c) allows us to draw sound inferences wherever required. As a curiosity, we also note that well-known examples such as Klee-Minty cubes and Goldfarb cubes that exhibit worst case behavior for SIMPLEX algorithms happen to be SRCs. It is unclear if such SRCs will arise in practical verification problems.

For our purposes herein, we assume optimization is always performed using weak optimization. Nevertheless, any call to weak optimization can be substituted by a call to strong optimization. Experimental results provide further justification for this choice.

We also use optimization to compare expressions wrt a given SRC $\phi$. We write $e_1 \gg_\phi e_2$ iff $\phi \models_w e_1 \geq e_2$. Expressions are equivalent, written $e_1 \equiv_\phi e_2$, if $\phi \models e_1 = e_2$, and incomparable, denoted $e_1{}_\phi e_2$, if neither inequality holds.

Abstraction. The abstraction function converts arbitrary first-order formulae to symbolic ranges. In practice, programs we analyze are first linearized. Therefore, abstraction needs to be defined only on polyhedra. Abstraction is used as a primitive operation that organizes arbitrary linear constraints into the form of SRCs.

Let $\psi$ be a polyhedron represented as a conjunction of linear inequalities $\wedge_i e_i \geq 0$. We seek a SRC $\phi : \alpha(\psi)$ such that $\psi \models \phi$. Unfortunately, this SRC abstraction $\alpha(\psi)$ may not be uniquely defined. Turning now to FIG. 2(A)-FIG. 2(D), there is shown a series of four possible SRC abstractions for a hexagon in 2 dimensions that are all semantically incomparable.

An Abstraction of a given polyhedron $\psi$ is performed by sequentially inserting the inequalities of $\psi$ into a target SRC, starting initially with the SRC true. The result is an SRC $\alpha(\psi)$.

Inequality Insertion. Let $\phi$ be a SRC and $e_j \geq 0$ be an inequality. As a primitive we consider the problem of deriving an abstraction $\alpha(\phi \wedge e_j \geq 0)$. We consider the case wherein $x_j \leq b_j$ is the bounded form of $e_j$. The case where the bounded form is $x_j \geq b_j$ is handled symmetrically. Also, let $l_j \leq x_j \leq u_j$ be the existing bounds for $x_j$ in $\phi$.

Turning our attention now to FIG. 3, there is shown a series of three cases FIG. 3(A)-FIG. 3(C) encountered during abstraction. Using expression comparison, we distinguish three cases, FIG. 3(A) $b_j \gg_{\phi_{[j+1]}} u_j$, FIG. 3(B) $u_j \gg_{\phi_{[j-1]}} b_j$ and FIG. 3(C) $u_j{}_{\phi_{[j+1]}} b_j$. For the case shown in FIG. 3(A), the bound $x_j \leq u_j$ entails $x_j \leq b_j$, therefore we need not replace $u_j$. The reverse holds for the case shown in FIG. 3(B), and $u_j$ is replaced. However, for case shown in FIG. 3(C), neither bound entails the other. We call this a conflict.

A conflict forces us to choose between two bounds $u_j, b_j$ where neither is semantically stronger than the other. Conflicts are due to the lack of a unique SRC abstraction. We handle conflicts using conflict resolution heuristics provided by the user. We now describe a few of the possible heuristics Interval Heuristic: When employing an interval heuristic, we consider the worst case interval bound on $x_j$ resulting from either choice of bounds. Let c=max $b_j$s.t.$\phi_{[j+1]}$ and similarly, d=max $u_j$s.t.$\phi_{[j+1]}$. If c<d, we replace $u_j$ by $b_j$, and retain $u_j$ otherwise. A geometric interpretation of such is shown diagrammatically in FIG. 3(C).

Metric Heuristic: When employing a metric heuristic, we first choose the bound that minimizes the volume of the resulting SRC, or alternatively, the distance from a reference set.

LexOrder Heuristic: When employing a LexOrder heuristic, we choose syntactically according to lexicographic order.

Fixed Heuristic: A fixed heuristic involves always choosing to retain the original bound $u_j$, or replace it with $b_j$.

The result of abstraction is not guaranteed to be normalized. If there are no conflicts in the abstraction process then semantic equivalence of the SRC to the original polyhedron follows. In summary, the abstraction algorithm is parameterized by the conflict resolution heuristic. Our implementation uses the interval heuristic to resolve conflicts and the lexicographic order to break ties. For example, we let $\alpha$ denote the abstraction function that uses some conflict resolution strategy.

Lemma 2. For a constraint $\psi$, $\alpha(\psi)$ is a SRC and $\psi \models \alpha(\psi)$.

Each inequality insertion requires us to solve finitely many optimization problems. Weak optimization requires time $O(n^2)$. Therefore, the SRC abstraction a polyhedron with m inequalities can be computed in time $O(n^2 m)$.

4. Domain Operations

With these details in place, we may now discuss the implementation of various operations required for static analysis over SRCs.

Forced normalization. A SRC $\phi$ may fail to be normalized in the course of our analysis as a result of abstraction or other domain operations. Failure of normalization can itself be detected in $O(n^3)$ time using weak optimization using the lemma below:

Lemma 3. A SRC $\phi$ is normalized iff for each bound $l_i \leq x_i \leq u_i$, $0 \leq i < n$, $\phi_{[i+1]} \models_w l_i \leq u_i$. Note that the $\models_w$ relation is sufficient to test normalization.

Bottom-up normalization: In general, a SRC that is not normalized may not have a normal equivalent. However, it is frequently the case that normalization may be achieved by simply propagating missing information from lower order indices up to the higher order indices. We consider each bound $l_j \leq x_j \leq u_j$, for $j=n-1, \ldots, 1$, and insert the implied inequality $l_j \leq u_j$ into $\phi_{[j+1]}$ using the abstraction procedure described previously. This process does not always produce a normalized constraint. However, the procedure itself is useful since it can sometimes replace missing bounds for variables by using a bound implied by the remaining constraints.

EXAMPLE 5

Recall the SRC $\phi$ from Example 3. The implied inequality $x_2+4(\leq x_1) \leq 2x_3+x_2+4$ simplifies to $x_3 \geq 0$. When inserted, this yields the normalized SRC $\phi'$ from Example 2.

Even though bottom-up normalization is not always guaranteed to succeed, it generally improves the result of the weak optimization algorithm. We therefore employ it after other domain operations as a pre-normalization step.

Top-down normalization: Add constant offsets $\alpha_j, \beta_j > 0$ to bounds $l_j, u_j$ such that the resulting bounds $l_j - \alpha_j \leq x_j \leq u_j + \beta_j$ are normalized. In practice, $\alpha_j, \beta_j$ may be computed by recursively normalizing $\phi_{[j+1]}$ and then using weak optimization. As a corollary of Lemma 3, the top-down normalization technique always normalizes.

Lemma 4: Let $\phi$ be an SRC and $\phi_1, \phi_2$ be the results of applying bottom-up and top-down techniques, respectively to $\phi$. It follows that $\phi \models \phi_1$ and $\phi \models_w \phi_2$. However, $\phi \models_w \phi_1$ does not always hold.

Following other numerical domains, we note that normalization should never be forced after a widening operation to ensure termination.

Intersection & join. Given two SRCs $\phi_1 \wedge \phi_2$ their intersection can be performed by using the abstraction procedure, i.e., $\phi_1 \sqcap \phi_2 = \alpha(\phi_1 \wedge \phi_2)$. In general, the best possible join $\phi_1 \sqcup \phi_2$ for SRCs $\phi_1, \phi_2$ can be defined as the abstraction of the polyhedral convex hull $\phi_1, \phi_2$. However, convex hull computations are expensive, even for SRCs.

We now describe a direct generalization of the interval join used for value ranges. Let $l_j \leq x_j \leq u_j$ be a bound in $\phi_1$ (similar analysis is used for bounds in $\phi_2$). Consider the following optimization problems:

$$c_j^1 = \min x_j - l_j \text{ s.t. } \phi_2, \quad d_j^1 = \max x_j - u_j \text{ s.t. } \phi_2.$$

Note that $\phi_2 \models l_j + c_j^1 \leq x_j \leq u_j + d_j^1$, while $\phi_1 \models l_j + 0 \leq x_j \leq u_j + 0$. As a result, $(\phi_1 \sqcup \phi_2) \models l_j + \min(c_j^1, 0) \leq x_j \leq u_j + \max(0, d_j^1)$. We call such a constraint the relaxation of $x_j$ in $\phi_1$. Let $\phi_{12}$ be the result of relaxing each bound in $\phi_1$ wrt $\phi_2$. Similarly, let $\phi_{21}$ be obtained by relaxing each bound in $\phi_2$ wrt $\phi_1$. We define the range join as $\phi_1 \sqcup \phi_2 : \phi_{12} \sqcap \phi_{21}$.

Lemma 5. Given any SRC $\phi_1, \phi_2, \phi_i \models_w \phi_1 \sqcup \phi_2, i=1,2$. Also, $\phi_1 \sqcap \phi_2 \models \phi_i$. However, this containment may not be provable using $\models_w$.

Relaxing each constraint requires $O(n)$ optimization, each requiring $O(n^2)$ time. Finally, abstraction itself requires $O(n^3)$ time. As a result join can be achieved in time $O(n^3)$.

EXAMPLE 6

Consider the SRCs $\phi_1, \phi_2$ shown below:

$$\varphi_1: \begin{Bmatrix} x_2 & \leq & x_1 & \leq & 2x_2+4 \\ x_3 & \leq & x_2 & \leq & 5 \\ -4 & \leq & x_3 & \leq & 4 \end{Bmatrix}$$

$$\varphi_2: \begin{Bmatrix} -\infty & \leq & x_1 & \leq & x_2 \\ 0 & \leq & x_2 & \leq & x_3+1 \\ 0 & \leq & x_3 & \leq & 2 \end{Bmatrix}$$

The relaxed constraints are given by $$\varphi_{12}: \begin{Bmatrix} -\infty & \leq & x_1 & \leq & 2x_2+4 \\ x_3-2 & \leq & x_2 & \leq & 5 \\ -4 & \leq & x_3 & \leq & 4 \end{Bmatrix}$$

$$\varphi_{21}: \begin{Bmatrix} -\infty & \leq & x_1 & \leq & x_2+9 \\ -4 & \leq & x_2 & \leq & x_3+9 \\ -4 & \leq & x_3 & \leq & 4 \end{Bmatrix}$$

The join is computed by intersecting these constraints:

$$\phi: -\infty \leq x_1 \leq 2x_2+4 \wedge x_3-2 \leq x_2 \leq 5 \wedge -4 \leq x_3 \leq 4.$$

Projection. Projection is an important primitive for implementing the transfer function across assignments and modeling scope in inter-procedural analysis. The "best" projection is, in general, the abstraction of the projection carried out over polyhedra. However, like convex hull, polyhedral projection is an exponential time operation in the worst case.

Definition 5—Polarity: A variable z occurring in the RHS of a bound $x_j \bowtie b_j$ has positive polarity if $b_j$ is a lower bound and z has a positive coefficient, or $b_j$ is an upper bound and z has a negative coefficient. The variable has negative polarity otherwise. Variable z with positive polarity in a constraint is written $z^+$, and negative polarity as $z^-$ (see Example 7).

Direct projection: Consider the projection of $x_j$ from SRC $\phi$. Let $l_j \leq x_j \leq u_j$ denote the bounds for the variable $x_j$ in $\phi$. For an occurrence of $x_j$ in a bound inequality of the form $x_i \bowtie b_i$: $\vec{c}^T \vec{x} + d$ (note $i < j$ by triangulation), we replace $x_j$ in this expression by one of $l_j, u_j$ based on the polarity replacement rule: occurrences of $x_j^+$ are replaced by the lower bound $l_j$, and $x_j^-$ are by $u_j$. Finally, $x_j$ and its bounds are removed from the constraint. Direct projection can be computed in time $O(n^2)$.

Lemma 6: Let $\phi'$ be the result of a simple projection of $x_j$ from $\phi$. It follows that $\phi'$ is an SRC and $(\exists x_j) \phi \models \phi'$. Direct projection of z from $\phi: z^+ \leq x \leq z^- + 1 \wedge z^+ - 2 \leq y \leq z^- + 3 \wedge -\infty \leq z \leq 5$, replaces $z^+$ with $-\infty$ and $z^-$ with 5 at each occurrence, yielding $\phi': -\infty \leq x \leq 6 \wedge -\infty \leq y \leq 8$.

Indirect projection. Advantageously, direct projection can be improved by using a simple modification of Fourier-Motzkin elimination technique. A matching pair for the variable $x_j$ consists of two occurrences of variable $x_j$ with opposite polarities in bounds $x_i \bowtie \alpha_i x_j^+ + e_i$ and $x_k \bowtie \alpha_j x_j^- + e_k$ with $i \neq k$. The matching pairs for the SRC $\phi$ from Example 7 are:

$$\varphi: \left\{ (z^+) \leq x \leq (z^-) +1 \wedge (z^+) -2 \leq y \leq (z^-) +3 \wedge -\infty \leq z \leq 5 \right\}$$

There are two matching pairs for the variable z shown using arrows. The matching pair $z^+ \leq x$ and $y \leq z^- + 3$ can be used to rewrite the former constraint as: $y - 3 \leq x$. Similarly the other matching pair can be used to rewrite the upper bound of x to $x \leq y + 2$. An indirect projection of the constraint in Example 7, using matching pairs yields the result $$y-3 \leq x \leq y+3 \wedge -\infty \leq y \leq 8.$$

Matching pairs can be used to improve over direct projection, especially when the existing bounds for the variables to be projected may lead to too coarse an over-approximation. They are sound and preserve the triangular structure.

Substitution. The substitution $x_j \mapsto e$ involves the replacement of every occurrence of $x_j$ in the constraint by e. In general, the result of carrying out the replacements is not a SRC. However, the abstraction algorithm can be used to reconstruct a SRC as $\phi': \alpha(\phi[x \mapsto e])$.

Transfer function. Consider a SRC $\phi$ and an assignment $x_j := e$, where $e \equiv \vec{c}^T \vec{x} + d$. The assignment is invertible if $c_j \neq 0$, on the other hand the assignment is non-invertible or destructive if $c_j = 0$. An invertible assignment can be handled using a substitution $$\psi : \varphi\left[x_j \mapsto \frac{1}{c_j}(x_j - (e - c_j x_j))\right].$$

A destructive update is handled by first using the projection algorithm to compute $\phi' : \exists x_j \phi$ and then computing the intersection $\psi : \alpha(\phi' \wedge x_j = e)$ using the abstraction algorithm.

Widening. An instance of widening consists of two SRCs $\phi_1, \phi_2$ such that $\phi_1 \models \phi_2$. Using widening, we simply drop each constraint in $\phi_1$ that is not entailed by $\phi_2$. Let $x_j \leq u_j$ be an upper bound in $\phi_1$. We first compute $c_j = \max.(x_j - u_j) \text{s.t.} \phi_2$. If $c_j > 0$ then $\phi_2 \not\models_\pi x_j \leq u_j$. Therefore, we need to drop the constraint. This may be done by replacing the bound $u_j$ with $\infty$. A better widening operator is obtained by first replacing each occurrence of $x_j^-$ ($x_j$ occurring with negative polarity) by a matching pair before replacing $u_j$. Lower bounds such as $x_j \geq l_j$ are handled symmetrically.

Lemma 7 The SRC widening $\nabla_R$ satisfies (a) $\phi_1, \phi_2 \models_\pi \phi_1 \nabla_R \phi_2$; (b) any ascending chain eventually converges (even if $\models_\pi$ is used to detect convergence), i.e., for any sequence $\psi_1, \ldots, \psi_n, \ldots$, the widened sequence $\phi_1, \ldots$, satisfies $\phi_{N+1} \models_\pi \phi_N$, for some $N > 0$.

Narrowing. The SRC narrowing is similar to the interval narrowing. Let $\phi_2 \models \phi_1$. The narrowing $\phi_1 \Delta_r \phi_2$ is given by replacing every $\pm \infty$ bound in $\phi_1$ by the corresponding bound in $\phi_2$.

Lemma 8. For any SRCs $\phi_1$ and $\phi_2$, s.t. $\phi_2 \models \phi_1$, $\phi_1 \Delta_r \phi_2 \models \phi_1$. Furthermore, the narrowing iteration for SRC domain converges.

Equalities. While equalities can be captured in the SRC domain itself, it is beneficial to compute the equality constraints separately. An equality constraint can be stored as $A\vec{x} + \vec{b} = 0$ where A is a n×n matrix. In practice, we store A in its triangulated form assuming some ordering on the variables. Therefore, it is possible to construct the product domain of SRC and linear equalities wherein both domains share the same variable ordering. The equality part is propagated using Karr's analysis.

Using the same variable ordering allows us to share information between the two domains. For instance, $\pm \infty$ bounds for the SRC component can be replaced with bounds inferred from the equality constraints during the course of the analysis. The equality invariants can also be used to delay widening. Following the polyhedral widening operator of Bagnara et al., we do not apply widening if the equality part has decreased in rank during the iteration.

Variable Ordering

We now consider the choice of the variable ordering. The variable ordering used in the analysis has a considerable impact on its precision. The ideal choice of a variable ordering requires us to assign the higher indices to variables which are likely to be unbounded, or have constant bounds. Secondly, if a variable x is defined in terms of y in the program flow, it is more natural to express the bounds of x in terms of y than the other way around. We therefore consider two factors in choosing a variable ordering: (a) ordering based on variable type or its purpose in the code; and (b) ordering based on variable dependencies.

The determination of the "type" or "purpose" of a variable is made using syntactic templates. For instance, variables used as loop counters, or array indices are assigned lower indices than loop bounds or those that track array/pointer lengths. Similarly, variables used as arguments to functions have higher indices than local variables inside functions. These variables are identified in the front end during CFG construction using a simple variable dependency analysis.

Variables of a similar type are ordered using data dependencies. A dataflow analysis is used to track dependencies among a variable. If the dependency information between two variables is always uni-directional we use this information to determine a variable ordering. Finally, variables which cannot be otherwise ordered in a principled way are ordered randomly.

5. Exemplary Implementation

We have implemented an exemplary analysis tool to prove array accesses safe as part of an ongoing. Our analyzer is targeted towards proving numerous runtime safety properties of C programs including array and pointer access checks. The analyzer is context sensitive, by using call strings to track contexts. While recursive functions cannot be handled directly, they may be abstracted by unrolling to some fixed length and handling the remaining calls context insensitively. Our abstract interpreter supports a combination of different numerical domains, including constant folding, interval, octagon, polyhedron and SRC domains. For our experiments, we used off-the-shelf implementations of the octagon abstract domain library, and the Parma Polyhedron Library. Each library was used with the same abstract interpreter to carry out the program analysis.

The tool constructs a CFG representation from the program, which is simplified using program slicing, constant propagation, and optionally by interval analysis. A linearization abstraction converts operations such as multiplication and integer division into non-deterministic choices. Arrays and pointers are modeled by their allocated sizes while array contents are abstracted away. Pointer aliasing is modeled soundly using a flow insensitive alias analysis.

Variable clustering. The analysis model size is reduced by creating small clusters of related variables. For each cluster, statements that involve variables not belonging to the current cluster are abstracted away. The analysis is performed on these abstractions. A property is considered proved only if it can be proved in each context by some cluster abstraction. Clusters are detected heuristically by a backward traversal of the CFG, collecting the variables that occur in the same expressions or conditions. The backward traversal is stopped as soon as the number of variables in a cluster first exceeds 20 variables for our experiments. The number of clusters ranges from a few hundreds to nearly 2000 clusters.

Iteration Strategy. The fixpoint computation is performed by means of an upward iteration using widening to converge to some fixed point followed by a downward iteration using narrowing to improve the fixed point until no more improvements are possible. To improve the initial fixed point, the onset of widening is delayed by a fixed number of iterations (2 iterations for our experiments). The iteration strategy used is semi-naive. At each step, we minimize the number of applications of post conditions by keeping track of nodes whose abstract state changed in the previous iteration. In the case of the polyhedral domain, the narrowing phase is cut off after a fixed number of iteration to avoid potential non termination.

6. Experiments

Our experiments involved the verification of C programs for runtime errors such as buffer overflows, null pointer accesses, and string library usage checks. The domains are compared simply based on their ability to prove properties.

Small Benchmarks. We first compare the domains on a collection of small example programs. These programs are written in the C language, and range from 20-400 lines of code. The examples typically consist of statically or dynamically allocated arrays accessed inside loops using aliased pointers, and passed as parameters to string/standard library functions.

Table 1(A) and 1(B) summarizes the results on these examples. Table 1(A) shows the total running times and the number of properties established. The properties proved by the domains are compared pairwise. The pairwise comparison summarizes the number of properties that each domain could (not) prove as compared to other domains. In general, the SRC domain comes out slightly ahead in terms of proofs, while remaining competitive in terms of time. An analysis of the failed proofs revealed that roughly 25 are due to actual bugs (mostly unintentional) in the programs, while the remaining were mostly due to modeling limitations.

Comparison of Implementation Choices. Our implementation of SRCs requires heuristics for optimization, variable ordering and conflict resolution while abstracting. Table 2 compares the proofs and running times for some alternative strategies for these operations. Each experiment in the table changes one option at a time, leaving the others unchanged. The choices we made for these strategies perform better than the more ad-hoc strategies used in these experiments. In particular, the difference is most pronounced when the variable ordering used is exactly the reverse of that suggested by our heuristic.

Network Controller Study. We studied the performance of our analyzer on a commercial network controller implementation. The analysis is started at different root functions assuming an unknown calling environment. Root functions are chosen based on their position in the global call graph. Each analysis run first simplifies the model using slicing, constant folding and interval analysis.

Table 3 shows each of these functions along with the number of properties sliced away as a result of all the front-end simplifications. Also note that a large fraction of the properties can be handled simply by using interval analysis and constant folding. Slicing the CFG to remove these properties triggers a large reduction in the CFG size.

Table 4 compares the performance of the SRC domain with the octagon and polyhedral domains on the CFG simplified by slicing, constant folding and intervals. The interval domain captures many of the easy properties including the common case of static arrays accessed in loops with known bounds. While the SRC and octagon domains can complete on all the examples even in the absence of such simplifications, running interval analysis as a pre-processing step nevertheless lets us focus on those properties for which domains such as octagons, SRC and polyhedra are really needed. In many situations, the domains produce a similar bottom line. Nevertheless, there are cases where SRCs capture proofs missed by octagons and polyhedra. The SRC domain takes roughly 2.5× more time than the octagon domain. On the other hand, the polyhedral domain proves much fewer properties than both octagons and SRCs in this experiment, while requiring significantly more time. We believe that the iteration strategy used, especially the fast onset of widening and the narrowing cutoff for polyhedra may account for the discrepancy. On the other hand, increasing either parameter only serve to slow the analysis down further. In general, precise widening operators along with techniques such as lookahed widening, landmark-based widening or widening with acceleration can compensate for the lack of a good polyhedral narrowing.

7. Conclusion

At this point, while we have discussed and described the invention using some specific examples, our teachings are not so limited. In particular, those skilled in the art will have recognized that we have described a technique employing an abstract domain using symbolic ranges that advantageously captures many properties that are missed by other domains such as octagons and intervals. Our technique does not incur the large time complexity of the polyhedral domain. Accordingly, we expect to use the SRC domain in conjunction with intervals, octagons and polyhedra to prove more properties while incurring a reasonable time overhead. Additionally, another interesting possibility is to allow for a conjunction of many SRC constraints, each using a different variable ordering. Apart from checking overflows, the SRC domain may also be useful for analyzing the numerical stability of floating point loops. The constraint handling techniques presented are therefore directly applied to practical tools such as ARCHER and ESP. Accordingly, the invention should be only limited by the scope of the claims attached hereto

The invention claimed is:

1. A computer-implemented method for generating a representation of relationships between variables in a program comprising the steps of:

automatically generating a set of Symbolic Range Constraints (SRCs) for the variables, wherein said SRCs are of the form $\phi: \Lambda_{i=1}^{n} l_i \leq x_i \leq u_i$ where for each i $\in$[1,n], the linear expressions $l_i$, $u_i$ are made up of variables in the set $\{x_{i+1}, \ldots, x_n\}$, and wherein said SRCs comprise linear, convex, and triangulated constraints for a given variable order; and providing said generated set of SRCs to a user.

2. The computer-implemented method of claim 1 employing a JOIN operation on SRC representations.

3. The computer-implemented method of claim 1 employing a MEET operation on SRC representations.

4. The computer-implemented method of claim 1 employing a transfer function of SRC representations with respect to a program statement.

5. The computer-implemented method of claim 1 employing a WIDENING operation on SRC representations.

6. The computer-implemented method of claim 1 employing a NARROWING operation on SRC representations.

7. The computer-implemented method of claim 1 further comprising the step of checking for inclusion of SRC representations.

8. The computer-implemented method of claim 1 which determines the correctness of the program by checking a safety property.

9. The computer-implemented method of claim 1 which determines the correctness of a program by detecting buffer overflow conditions.

10. The computer-implemented method of claim 1 which determines the correctness of a program by detecting null pointer dereferences.

11. The computer-implemented method of claim 1 which, used in an optimizing compiler, optimizes the program for size/performance.

12. The computer-implemented method of claim 1 which, used in a static analyzer, performs a program analysis.

13. The computer-implemented method of claim 1 which, used in a model checker, performs verification of the program.

* * * * *